United States Patent [19]
Wright

[11] 3,808,592
[45] Apr. 30, 1974

[54] VEHICLE SEAT BELT SIGNAL AND CONTROL SYSTEM

[75] Inventor: Frank Wright, Coventry, England

[73] Assignee: Jaguar Cars Limited, Coventry, England

[22] Filed: Apr. 25, 1972

[21] Appl. No.: 247,459

[30] Foreign Application Priority Data
Apr. 28, 1971 Great Britain.................... 11873/71

[52] U.S. Cl............ 340/52 E, 340/278, 307/10 SB, 180/82 C
[51] Int. Cl............................................. B60r 21/10
[58] Field of Search.................... 340/52 E, 53, 278; 307/10 SB; 180/82 C

[56] References Cited
UNITED STATES PATENTS
3,226,674   12/1965   Eriksson............................... 340/53
3,438,455   4/1969   Redmond....................... 340/52 E X

*Primary Examiner*—Alvin H. Waring
*Attorney, Agent, or Firm*—Thomas J. Greer, Jr.

[57] ABSTRACT

In a system for inhibiting the driving of a motor vehicle unless all occupied seats have their associated seat belts fastened, and the gear selector is in "park" or "neutral," the electrical circuitry associated with the vehicle starter motor and ignition system is such that operation of the vehicle starter motor is prevented but the ignition system is allowed to function when an occupied seat does not have its associated seat belt fastened.

3 Claims, 2 Drawing Figures

VEHICLE SEAT BELT SIGNAL AND CONTROL SYSTEM

The present invention relates to seat belts for motor vehicles and is particularly concerned with a seat belt system which incorporates an alarm device adapted to operate if there is an attempt to drive the vehicle with the safety belt of an occupied seat unfastened.

One legal requirement specifies that the alarm device shall operate when the gear selector of the vehicles transmission is in "drive" or "in-gear" but that it should not operate when the gear selector is in "park" or "neutral." It is also a requirement that the ignition system should not be cut out at any time because of a failure to fasten a seat belt. The terms "park" and "drive" are used in connection with an automatic transmission and the terms "neutral" and "in-gear" are used in connection with a manually operable gearbox. However, for simplicity the terms "park" and "drive" are hereinafter used to also include the terms "neutral" and "in-gear" respectively.

According to the present invention in a system for inhibiting the driving of a motor vehicle unless all occupied seats have their associated seat belts fastened, and the gear selector is in "park" or "neutral," operation of the vehicle starter motor is prevented but the ignition system is allowed to function.

According to one aspect of the present invention a system for inhibiting the driving of a motor vehicle unless all occupied seats have their associated seat belts fastened, comprises the following combination of features:

a. each seat has associated with it first means indicative of a "seat occupied" and a "seat unoccupied" condition and second means indicative of a "belt fastened" and a "belt unfastened" condition;
b. third means indicative of a "park" or "drive" condition of the vehicle transmission; and
c. the first, second and third means are so arranged that the following logic applies to the system:

| Seat Starter | Belt | Trans-mission | Alarm | Ignition |
|---|---|---|---|---|
| Occupied | Fastened | Drive | Off | On | On |
| Occupied | Fastened | Park | Off | On | Off |
| Occupied | Unfastened | Park | Off | On | Off |
| Occupied | Unfastened | Drive | On | On | Off |

How the invention may be carried out will now be described by way of example only and with reference to the accompanying drawings in which.

In a motor vehicle each seat has a pressure sensitive switch associated with it which thus gives an indication of whether the seat is occupied or unoccupied. Each seat has a safety belt associated with it of the kind in which the belt has one end wound round a reel which is biased to retract the belt.

Each of the safety belts also has an electrical switch associated with it which switches are closed by the fastening of the belt, but otherwise are normally open and thus give an indication of whether a particular seat belt is fastened or unfastened.

Figure 1:
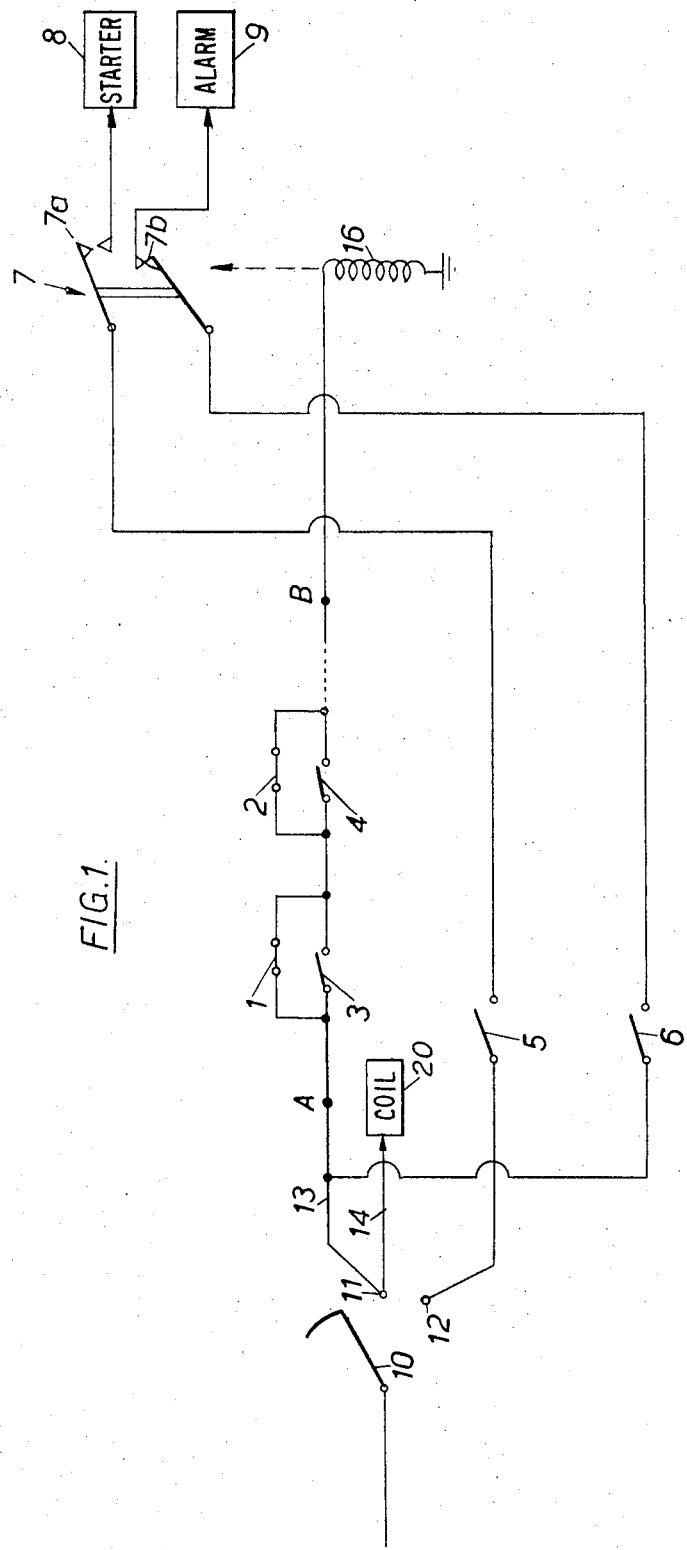
FIG. 1 is a circuit diagram showing a first embodiment of the invention.

In FIG. 1 the switches associated with two of the vehicle seats are shown, the pressure sensitive switches being labelled 1 and 2 and the seat belt switches labelled 3 and 4.

The gear or transmission selector of the vehicle also has two switches associated with it, a first labelled 5 being normally open and closed if the selector is put in the "park" position and the second, labelled 6, and normally open, being closed if the selector is put in the "drive" position.

A double pole switch 7 controls the supply of current to a starter motor 8 and to alarm 9, the two pairs of contacts of the switch 7 being arranged so that energization of the starter motor or alarm is mutually exclusive.

The system also incorporates the usual ignition switch 10 which can make contact with terminals 11 and 12.

A first lead 13 from the terminal 11 is connected to the series connected pairs of switches 1, 3 and 2, 4. A second lead 14 from the terminal 11 is connected to a coil 205 of the ignition system of the vehicle engine.

Assuming that the driver only has entered the vehicle and that the pair of switches 1, 3 are associated with the driver's seat then the switch 1 will be opened by the driver sitting in the driver's seat whereas the other seat switches 2 etc. will remain in their normally closed position and thus by-pass other associated belt switches 4 etc.

The driver's seat switch 1 is now open, and assuming that the driver has not fastened his seat belt, this leaves the switch 3 also open, and no current can reach the coil 16 which contrls the solenoid switch 7. Therefore, the contacts 7a of the switch 7 remain open and it is not possible to energize the starter. The contacts 7b are however closed and the alarm 9 will therefore be energized providing the switch 6 is also closed, ie. the transmission is in "drive." However, if the transmission is in "park" the circuit to the alarm 9 will not be made.

Assuming the driver now fastens his seat belt thus closing switch 3, this will cause the energisation of the coil 16 and consequent closure of the contacts 7a and opening of the contacts 7b. The circuit to the starter motor 8 will thus be made through the switch 5 and the circuit to the alarm 9 will be broken.

Assuming that the transmission is in "park" the switch 5 will be closed thus enabling the starter motor 8 to be energised. On the other hand, if the gear selector is in "drive" it will not be possible to energise the starter as the switch 5 will be open.

The full logic of the system shown in FIG. 1 is given in the following table.

| Seat | Belt | Trans-mission | Alarm | Ignition | Starter |
|---|---|---|---|---|---|
| Occupied | Fastened | Drive | Off | On | On |
| Occupied | Fastened | Park | Off | On | Off |
| Occupied | Unfastened | Park | Off | On | Off |
| Occupied | Unfastened | Drive | On | On | Off |

A disadvantage of the system described with reference to FIG. 1 is that it does not distinguish between the case where the driver has entered the vehicle and then fastened his seat belt and the case where the driver, on leaving the vehicle, fastens the seat belt and leaves it fastened until the next time he uses the vehicle. In the latter case the system shown in FIG. 1 would enable the driver to enter the vehicle and drive it without having the seat belt round him.

Figure 2:
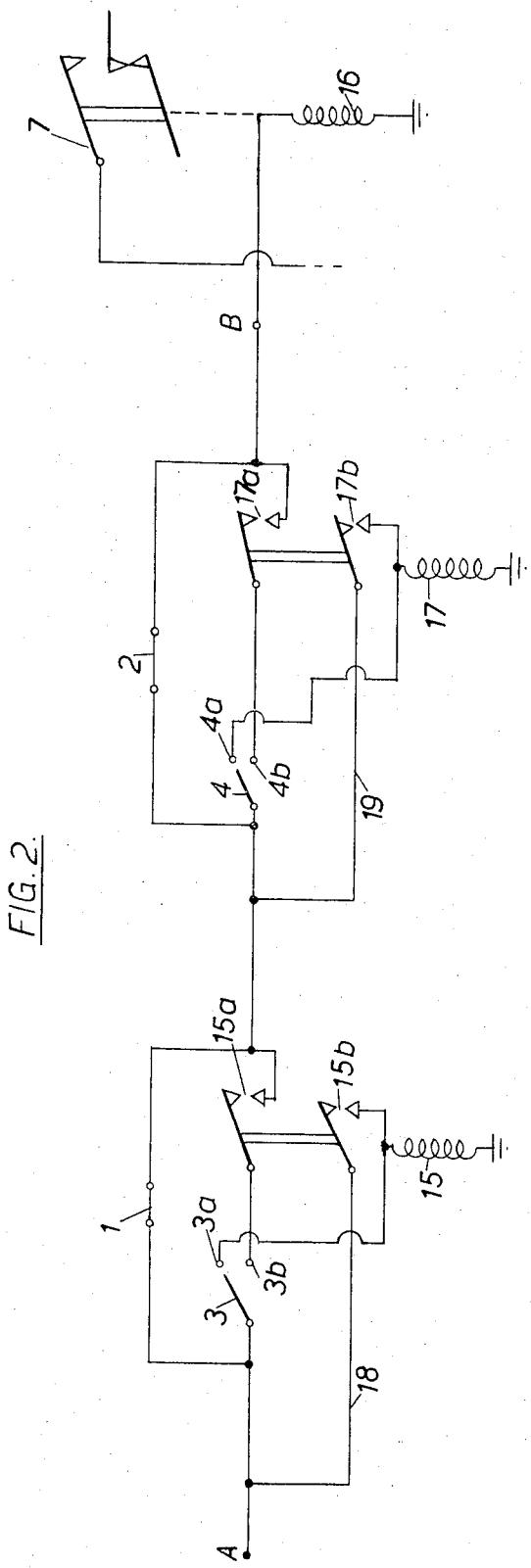
FIG. 2 is a circuit diagram showing a modification of the embodiment of FIG. 1.

In order to distinguish between these two situations the modification shown in FIG. 2 has been devised. Basically this modified system requires the driver to always undo the seat belt if it is already fastened at the time he attempts to start the car.

The circuit shown in FIG. 2 is basically the same as the portion of the circuit AB in FIG. 1, with the following modifications. A double pole relay 15 has contacts 15a in series with the switch 3 and the coil of the relay is energisable through second contacts 15b. The switch 3 has two contacts 3a and 3b, the contacts 3b being the same as those shown in FIG. 1. The contacts 3a serve to enable the coil of the relay 15 to be energised. The contacts 15b are connected to the line 13 by a holding line 18.

The switch arrangements associated with the other seats in the vehicle have corresponding double pole relays such as 17.

The operation of the modified circuit is as follows. If each occupied seat has its associated seat belt unlatched then the switches, such as 1, associated with the seat belt will be open, and the switches, such as 3, associated with the seat belt will be in the position shown in FIG. 2, i.e., in the case of switch 3 with the switch arm making a circuit through the contact 3a.

If the driver now turns on the ignition, a circuit is made through the switch arm 3, the contact 3a, the relay coil 15 to earth. The relay 15 is then energized and the contacts 15a and 15b are closed. Closure of the contacts 15a, 17a, etc. enables the relay coil 16 to be energized thus closing the double pole switch 7 and thus in turn enabling the starter to be energized, assuming, of course, that the switch 5 is also closed.

If the driver has left the seat belt latched after using the car on the previous occasion and then attempts to start the car, without actually using the seat belt, the arm of the switch 3 will be in circuit with the contact 3b and thus it will not be possible to energize the relay coil 15 to close the contacts 15a. Consequently, it will not be possible to energize the starter motor. The driver will thus be forced to unlatch the safety belt in order to energise the relay 15, close the contacts 15a and cause the relay 15 to be held through the line 18 and the contacts 15b. Having done this the driver can then latch the safety belt to make a circuit to the starter motor through the arm 3, contact 3b, the contacts 15a etc.

It will be appreciated that this modified system does not distinguish between the case where the driver unlatches the safety belt and then fastens it again in an inoperative position and the situation where he fastens it again round himself. The aim of the present invention is not to provide a completely foolproof system, which in practice is impossible, but to provide a system which makes it more inconvenient for the driver not to use the seat belt than to use it.

A possible drawback of the modified system of FIG. 2 is that if the driver having fitted the seat belt and driven the car then stops for a short time, turning off the ignition, to read a map for example, it will be necessary for him to undo the seat belt before being able to restart the car.

There are various possible ways in which this difficulty can be overcome. For example, it would be possible to incorporate in the system a device responsive to time which is set to distinguish between relatively short periods, such as that mentioned earlier, and relatively long periods, such as occur between parking the car and locking it and returning to it some time later. More specifically a time-delay device could be incorporated to ensure that the coil of relay 15 and the coil of relay 16 remained energized for a given time after the driver turns the ignition off. The time delay could be of the order of three minutes, for example.

A further possible way of dealing with this problem is to distinguish the two situations mentioned above by means of the combined ignition/steering column locking arrangement which is now common on cars. Such a lock usually has four positions; the first position in which the key can be inserted or removed, the second position in which accessories can be energized, the third position which causes the ignition to be turned on and the fourth position which causes the starter to be energized.

The short term situation referred to above can be associated with the second position of the key and the long term situation can be associated with the first position of the key and the system arranged so that if the key is in the second position it would not be necessary for the driver to unlatch and then relatch his seat belt, but if the key were in the first position it would be necessary.

An advantage of the system disclosed in FIG. 1 or 2 is that it is "fail-safe." In particular, energization of the coil 16 is required to de-energize the alarm 9. Consequently any failure in the circuit from the point A to the point B, or any attempt by the driver to render the sytem inoperative by breaking the path of the circuit, will not affect the energization of the alarm 9. This contrasts with prior art arrangements in which energisation of the alarm is through the equivalent of path A and B so that the driver can easily immobilise the warning system by cutting a wire, etc., in this part of the circuit.

I claim:

1. A system, for inhibiting the driving of a motor vehicle unless all occupied seats have their associated seat belts fastened, which includes:
   a. a pressure sensitive switch associated with a seating position and normally closed when the seat is unoccupied;
   b. a second switch normally open associated with a seat belt which in turn is associated with the said seating position, the second switch being parallel with the first switch;
   c. a relay coil in series with the parallel connection switches and having first and second pairs of relay contacts which are normally open and normally closed respectively;
   d. a first current supply point to which the parallel connected switches are connected;
   e. a second current supply point connected in series with the first pair of relay contacts through a third switch;
   f. a fourth switch in series with the second pair of relay contacts and connected to the first current supply point;
   g. an electric starter motor connected in series with the first, normally open, relay contacts; and
   h. an alarm device connected in series with the second, normally closed, relay contacts so that in the event of any break or failure in the circuit supplying the coil, the alarm device can still be energized.

2. A system as claimed in claim 1 in which:
   a. a second relay is associated with the said second switch;

b. the coil of the said second relay is connected to a first contact of the said second switch associated with a "seat belt unfastened" condition;

c. a second contact of the said second switch, associated with a "seat belt fastened" condition, is in series with a first pair of normally open contacts of the said second relay;

d. a second pair of normally open contacts of the said second relay are in series with the said first current supply point and the coil of the second relay in order to form a holding circuit for said coil, so that after switching on the ignition of the engine no current will be supplied to said first relay coil unless a circuit is made to the said second relay coil through the said second switch by unfastening the seat belt.

3. A system as claimed in claim 2 which includes a time delay device operable to maintain energization of said first relay coil for a predetermined time after the seat belt of an occupied seat has been unfastened.

* * * * *